July 6, 1937.  S. W. RUSHMORE  2,086,439
ENGINE COOLING SYSTEM
Filed June 28, 1932   2 Sheets-Sheet 1
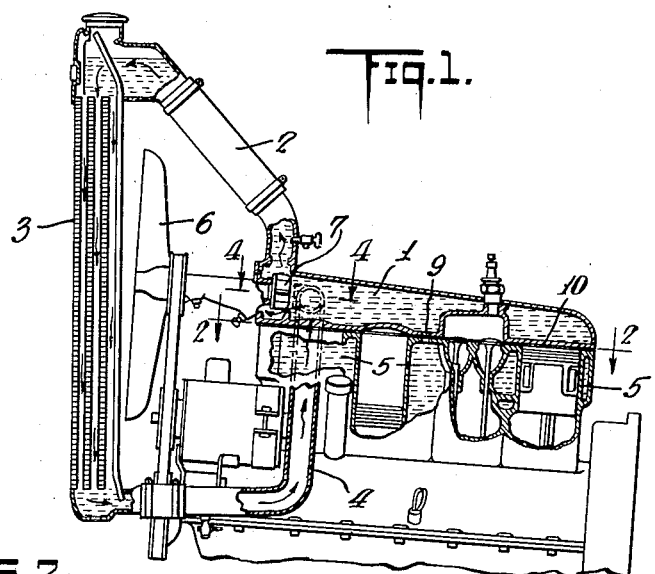
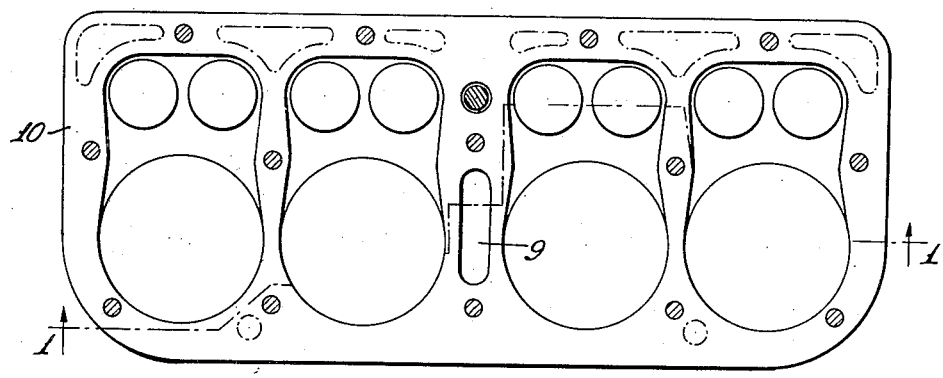
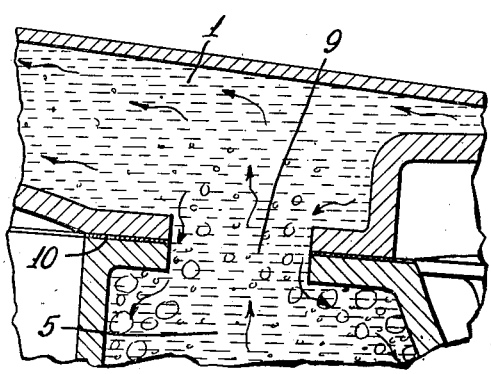
INVENTOR
Samuel W. Rushmore
BY
ATTORNEY

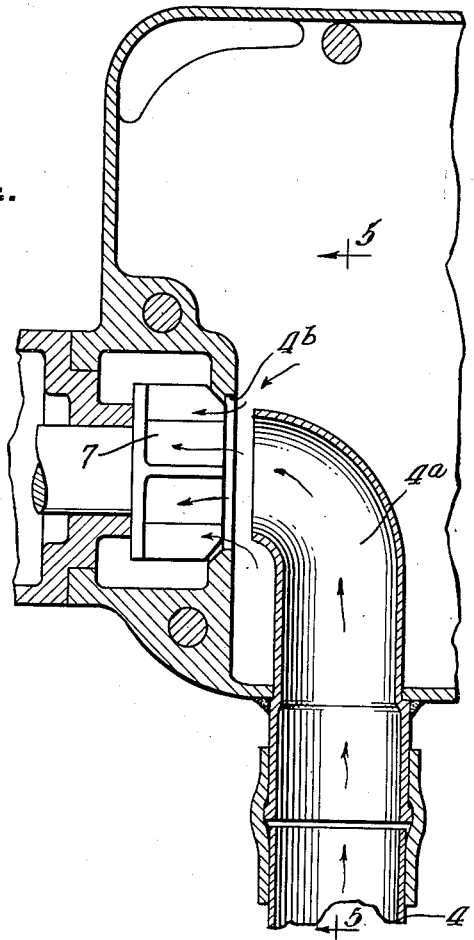
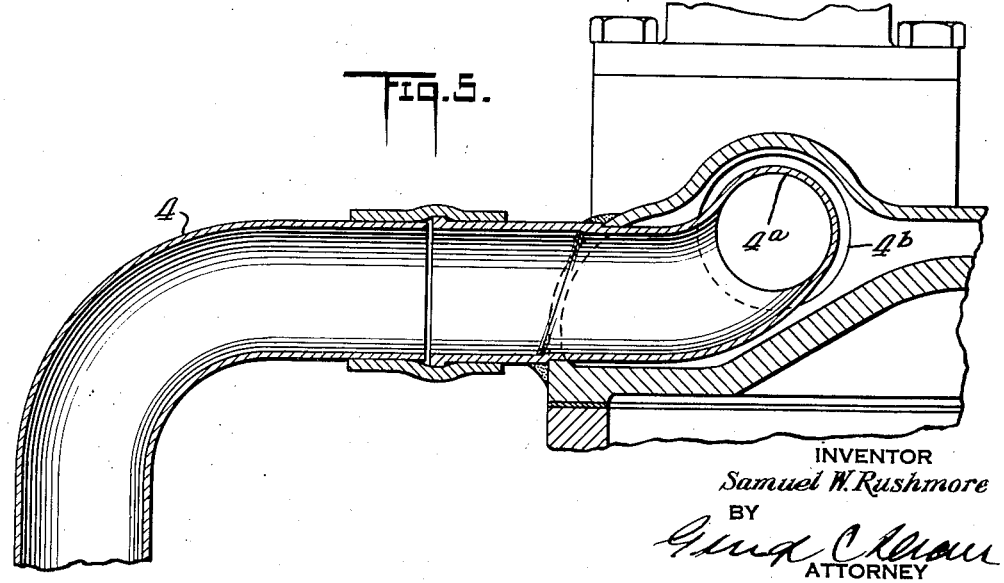

Patented July 6, 1937

2,086,439

UNITED STATES PATENT OFFICE 2,086,439

ENGINE COOLING SYSTEM

Samuel W. Rushmore, Plainfield, N. J.

Application June 28, 1932, Serial No. 619,660

3 Claims. (Cl. 123—178)

My present invention relates to a cooling system like conventional systems usually employed for water cooling internal combustion engines, as for instance, automobile engines; but modified so as to introduce a new method of operation.

In engines of the automobile type, it is highly desirable to maintain the interior surfaces of the cylinder walls at a relatively high and uniform temperature, preferably such as will be maintained when the water in the cylinder part of the jacket is at or near boiling, first, to maintain the oil on the inner surface at an optimum viscosity to reduce the serious oil shear or fluid friction losses which, under average conditions of automobile use, absorb and waste a large proportion of the power actually generated by the combustion of the fuel; and, second, to avoid condensation of the liquid fuel and the water, which is formed as a product of combustion, on said inner surface, because the condensed fuel and water, flowing down into the crank case, cause serious damage to the engine by contaminating and impairing the lubricating value of the oil.

While water at or near boiling is desirable for the cylinder jacket, it is also desirable to have the water in the head jacket at a temperature well below the boiling point, in order to keep down the tendency to detonation thereby permitting higher compression, while also maintaining the volumetric efficiency as high as possible.

I secure the above diverse temperature conditions and resulting advantages, for the cylinder and head respectively, through a new method of operation whereby the heat from the cylinder wall is absorbed as latent heat by evaporation of water in the cylinder jacket, and is carried away from the cylinder jacket in the form of steam, while the cylinder head is cooled by the direct flow of water as in conventional water cooling systems.

A convenient means for cooling a conventional automobile engine, is to use its external water cooling circuit wherein the cooling capacity of the radiator and the volume and velocity of the water circulation is designed to take care of the cooling requirement without any boiling of the water. But I connect the conduit from the bottom of such water cooling radiator directly to the head jacket, from which jacket the water returns to the top of the radiator in the conventional way, preferably aided by a pump. The cylinder jacket, located below the cylinder head, is connected to the head jacket only in shunt relation and, preferably, through but a single water passage. This passage between the cylinder and head jackets is preferably restricted to a cross section sufficient only to permit the ready escape of steam from the cylinder jacket, without obstructing the return flow of at least enough water to make up for the evaporative loss.

I have found by experiment that such a restricted passage, when made amply large to permit the free escape of steam and return of water, may yet be relatively small, in fact so small as practically to prevent any interchange of heat between the cylinder and head jackets until boiling occurs in the cylinder jacket.

In the arrangement shown in the drawings, I find it convenient to make the head jacket serve as a condenser for the steam generated in and issuing from the cylinder jacket.

The time required for heating both jackets to their respective normal temperatures may be shortened by locating the water inlet to the head jacket close to its outlet, as shown in the drawings, and in such case the head jacket may approach to boiling, under extreme conditions; but even so, any steam that could reach either the inlet or outlet will be condensed before reaching the radiator. This is because the cooling capacity of the external circuit is designed to keep the circulating part of the water below boiling, under all conditions.

One of the convenient and desirable methods of practicing my invention will be understood from the following description in connection with the accompanying drawings, of which Fig. 1 is a more or less schematic view showing in side elevation, partly broken to section, an engine embodying the new arrangement;

Fig. 2 is a greatly enlarged plan of the top of the cylinder block showing the communicating passage between the cylinder and cylinder head jackets, and also the insulating gasket which serves to maintain gas tightness within the cylinders and also as a barrier to oppose the flow of heat from the cylinder block to the cylinder head;

Fig. 3 is a vertical sectional view showing on a much larger scale the restricted communication between the cylinder jacket and the head jacket and adjacent parts, which are shown on much smaller scale in Fig. 1.

Fig. 4 is an enlarged view of the water conduit inlet and outlet, in section on the line 4—4, Fig. 1; and Fig. 5 is a section on the line 5—5, Fig. 4.

As indicated in Fig. 1, the water cooling circuit serially includes the water jacketed head 1, conduit 2 for upflow of water to the top of the radiator 3 and conduit 4 for return of cooled water from the bottom of the radiator, back to the head jacket. The water flows through the circuit by thermal action assisted by the centrifugal pump 7. The cylinder block also is water jacketed as at 5 and a communicating passage at 9 is formed by registering openings in the top of the cylinder block and bottom of the head block, the joint being sealed by a relatively thick gasket 10 consisting of sheet asbestos or other material adapted to form a heat barrier and preferably copper faced and of course, formed with an opening registering with the water passage 9.

While more than a single opening may be employed to afford communication between the cylinder and head jackets, experiment has shown that where more than one passage is employed, even though located closely together, there will be more or less thermal circulation between the head and cylinder jackets as the water warms up and thus the boiling may be delayed or altogether prevented. With a single passage large enough to permit ready escape of steam from the cylinder jacket without sufficient velocity to obstruct the downflow through the same passage of at least enough water to make up for the evaporative loss, I have found that there is practically no circulation of water to delay the boiling in the cylinder jacket.

Under conditions of light load, with but a single passage between the jackets, it is believed that there is a steady upflow of steam bubbles and corresponding downflow of water as shown in Fig. 3, while under conditions of maximum load, there seems to be set up a pulsating action or interchange of steam and water through the passage, but experience has shown that with but a single passage relatively even smaller than the passage 9 of Fig. 2, there is no risk of a shortage of water in the cylinder jacket or of over-heating, and in this connection it should be remembered that experience with steam cooling as described in my earlier patents, and as employed on large Diesel engines on the British dirigible R. 101, violently boiling water will carry away from a unit area of metal surface much more heat than can be carried away by water that is not boiling.

While the conduit 4, from the bottom of the radiator, may be arranged to discharge its water freely into the head jacket 1, I prefer to carry it through an extension nozzle 4a which directs the outflow of water toward the pump opening 4b. The clearance between the supply orifice and the outlet orifice may be varied to suit special conditions. The less the clearance, the shorter will be the period required for the upper and lower jackets to reach normal working temperature, but obviously the clearance should be sufficient to allow all steam to come into contact with the cold water in sufficiently subdivided condition to insure noiseless condensation. Even under the most extreme conditions, it is only necessary to give the steam an opportunity to come in contact with the water in order to be completely condensed because, as explained above, the volume and velocity of circulation of the water and cooling capacity of the radiator are designed to take care of all of the excess heat of the engine, by merely sensible heating and cooling of the water, without boiling. It is important to note in this connection that my present method provides for higher wall temperature, and consequently taking care of fewer heat units than have to be taken care of where only water cooling is brought into play.

Thus my system affords the ideal condition of high, almost constant, cylinder wall temperature on one hand, and on the other, a relatively cool head, which is so desirable in high compression engines to keep down detonation and to keep up volumetric efficiency.

In the operation of engines employing evaporative cooling for the cylinder block, in combination with water cooling for the cylinder head, there may be at times, and particularly after starting from cold, when there is a temperature difference between the cylinder and the head jacket, which may be as much as one hundred degrees F. or more. During such times of high temperature gradient, a standard cylinder-head gasket containing but a thin central layer of asbestos will permit considerable heat flow through the gasket and consequent delay in reaching boiling point in the cylinder jacket. So, in certain cases, it may be desirable to shorten the time required to reach boiling, and to maintain boiling temperature in the cylinder jacket under conditions of light load and cool weather, by using a gasket with a much larger ratio or thickness of asbestos than is necessary or is commonly employed where the sole purpose is to secure gas tightness.

I claim:

1. An internal combustion engine having upper and lower jacket compartments for cooling the head portions and cylinder portions respectively, in combination with means for circulating water through the head jacket at temperatures and rates adequate for absorbing the heat from both compartments by rise of temperature through a range far below the boiling point of the water, and a single passage for downflow of water from the upper compartment into the lower compartment and upflow of warm water and steam from the top of the lower compartment into the upper compartment, the flow section of said passage being sufficiently small to insure opposition to and limitation of the downflow by the upflow, and ultimate boiling in the lower compartment.

2. An internal combustion engine having water jacketed cylinders and head, together with a cooling circuit designed and operated for adequate cooling of the entire jacket without boiling the water; means separating the head part of the jacket from the cylinder part of the jacket, but affording restricted communication between them; the cooling circuit being connected for circulation of the water through adjacent inlet and outlet openings in the head part of the jacket so that water is supplied to the cylinder part of the jacket only through said restricted communication, said restricted communication limiting the flow of the water to the cylinder portion of the jacket sufficiently to insure near-boiling temperatures of the water in said cylinder jacket under low load conditions of operation, thereby causing it to boil under heavier load conditions.

3. An internal combustion engine having water jacketed cylinders and head, together with a cooling circuit, including an air cooled downflow radiator, and off-take from the head portion of the jacket to the top of said radiator and a return conduit from the bottom of the radiator, discharging directly into said outlet from the head jacket to the top of the radiator, and means for causing a desired portion of the jacket adjacent the inlet to operate as a steam condenser and the remainder of the jacket to operate by boiling and steam cooling under heavy load, including means affording restricted communication between the condenser portion and the boiler portion of the jacket, said restricted communication limiting interchange of water between said condenser and boiler portions of the jacket, sufficiently to insure condenser temperatures for the water in the condensing portion of the jacket and near boiling temperatures in the cylinder jacket under low load conditions of operation, thereby insuring boiling of the water in said boiler portion of the jacket under heavier load conditions.

SAMUEL W. RUSHMORE.